United States Patent [19]

Wernet et al.

[11] 4,342,883

[45] Aug. 3, 1982

[54] PUSHBUTTON SWITCH ASSEMBLIES FOR TELEPHONE SETS

[75] Inventors: William F. Wernet, Nashville; Steve Miller, Smyrna, both of Tenn.

[73] Assignee: Northern Telecom, Inc., Ottawa, Canada

[21] Appl. No.: 68,583

[22] Filed: Aug. 22, 1979

[51] Int. Cl.$^3$ .............................................. H04Q 1/16
[52] U.S. Cl. .................................. 179/99 R; 179/98; 179/1 PC; 361/398
[58] Field of Search ............... 361/398, 399, 412, 414, 361/415; 179/99 R, 98, 1 PC, 90 K

[56] References Cited

U.S. PATENT DOCUMENTS

| | | | |
|---|---|---|---|
| 3,909,564 | 9/1975 | Scheingold et al. | 361/398 |
| 3,970,802 | 7/1976 | Nisman | 179/98 |
| 3,982,081 | 9/1976 | Demler, Jr. | 361/398 |
| 4,143,932 | 3/1979 | Boutros | 361/398 |

OTHER PUBLICATIONS

"Flexi-connect for Versatile Interconnections", *Telesis*, Spring 1973, pp. 15-21, Peter Maheux.

*Primary Examiner*—Gerald L. Brigance
*Attorney, Agent, or Firm*—Schwartz, Jeffery, Schwaab, Mack, Blumenthal & Koch

[57] ABSTRACT

A pushbutton array, connector block and a connector, for mounting in a telephone set base, are mounted on and interconnected by a flexible printed circuit member, by connection pins on each item passing through the circuit member and wave soldered. The flexible circuit member can be bent or folded so that the various items attached can be mounted in the desired relative positions and orientation.

6 Claims, 5 Drawing Figures

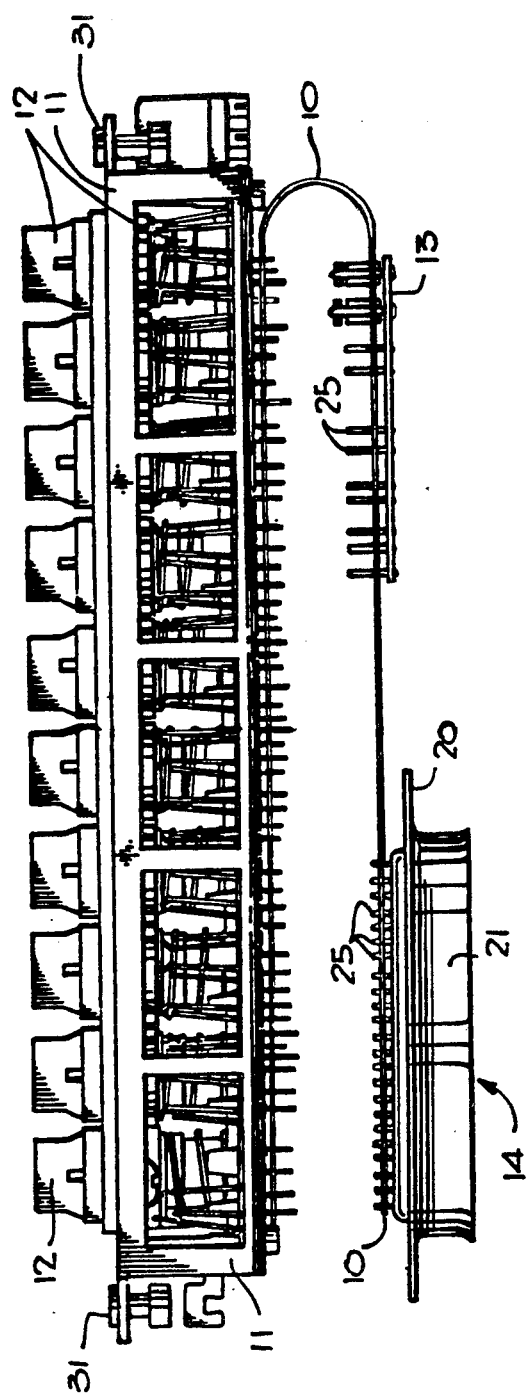

PUSHBUTTON SWITCH ASSEMBLIES FOR TELEPHONE SETS

This invention relates to pushbutton switch assemblies for telephone sets and is particularly concerned with assemblies comprising a unit containing a plurality of pushbutton switches, a terminal or connector block and a connector, all interconnected by a flexible circuit, to form a flexible, deformable unit for assembly with a telephone set. The invention is particularly applicable to a linear array of pushbutton switches.

Conventionally, in a telephone set having a plurality of pushbuttons for line selection and selection or other services, the terminals are hard wired to a terminal or connector block. That is, individual metal cored conductors are connected between connection members on the pushbutton switch array and connection members on the block, the conductors individually run and soldered at each end. Similarly, the connector is hard wired to the block. The connector forms one half of the connection by which the line cord from the private branch (PBX) is connected to the telephone set. In many instances the wiring is done after the pushbutton switch array, terminal or connector block and connector are mounted in the telephone set. Such wiring is slow and expensive, being high in labour content, and errors in the wiring can occur, and possibly damage to the insulation of conductors by the soldering iron used to make the connections.

The present invention provides an assembly in which the connection pins on the pushbutton array and the connection pins on the connector are inserted through a flexible circuit member and wave soldered to contact areas of the circuits. The terminal or connector block is in a particular example, in the form of a rigid PCB and the connection pin or the PCB are also inserted through the flexible circuit member and hand soldered to contact areas of the circuits. The pushbutton array, connector and terminal or connector block are assembled to the flexible circuit member such that the flexible circuit member can be bent, folded or otherwise manipulated so that the various members attached thereto can be mounted in the desired relative positions and orientations.

The invention will be readily understood by the following description in conjunction with the accompanying drawings, in which:

FIG. 5 is a side view of the assembly as in FIG. 4.

Figure 1:
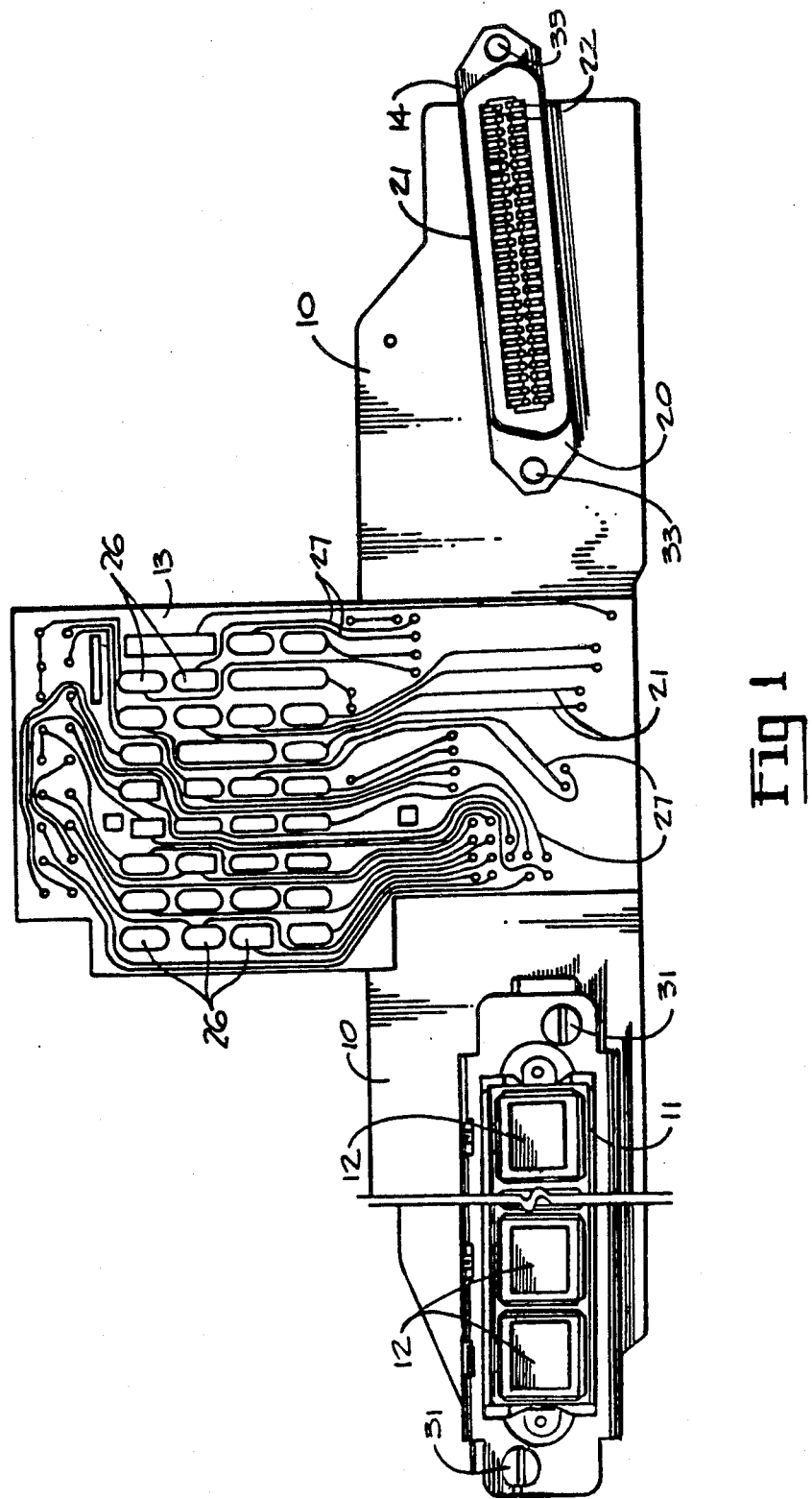
FIG. 1 is a top plan view of a flexible circuit member with a linear array of pushbutton switches, a terminal block and a connector attached thereto.
Figure 2:
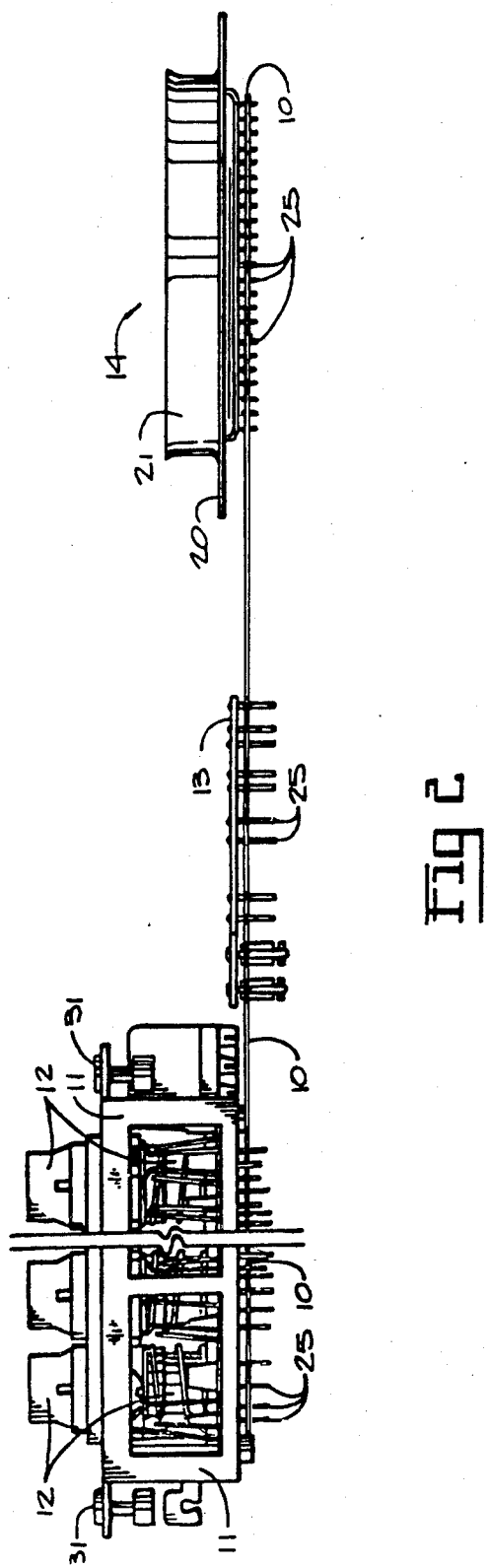
FIG. 2 is a side view of the assembly of FIG. 1.
Figure 3:
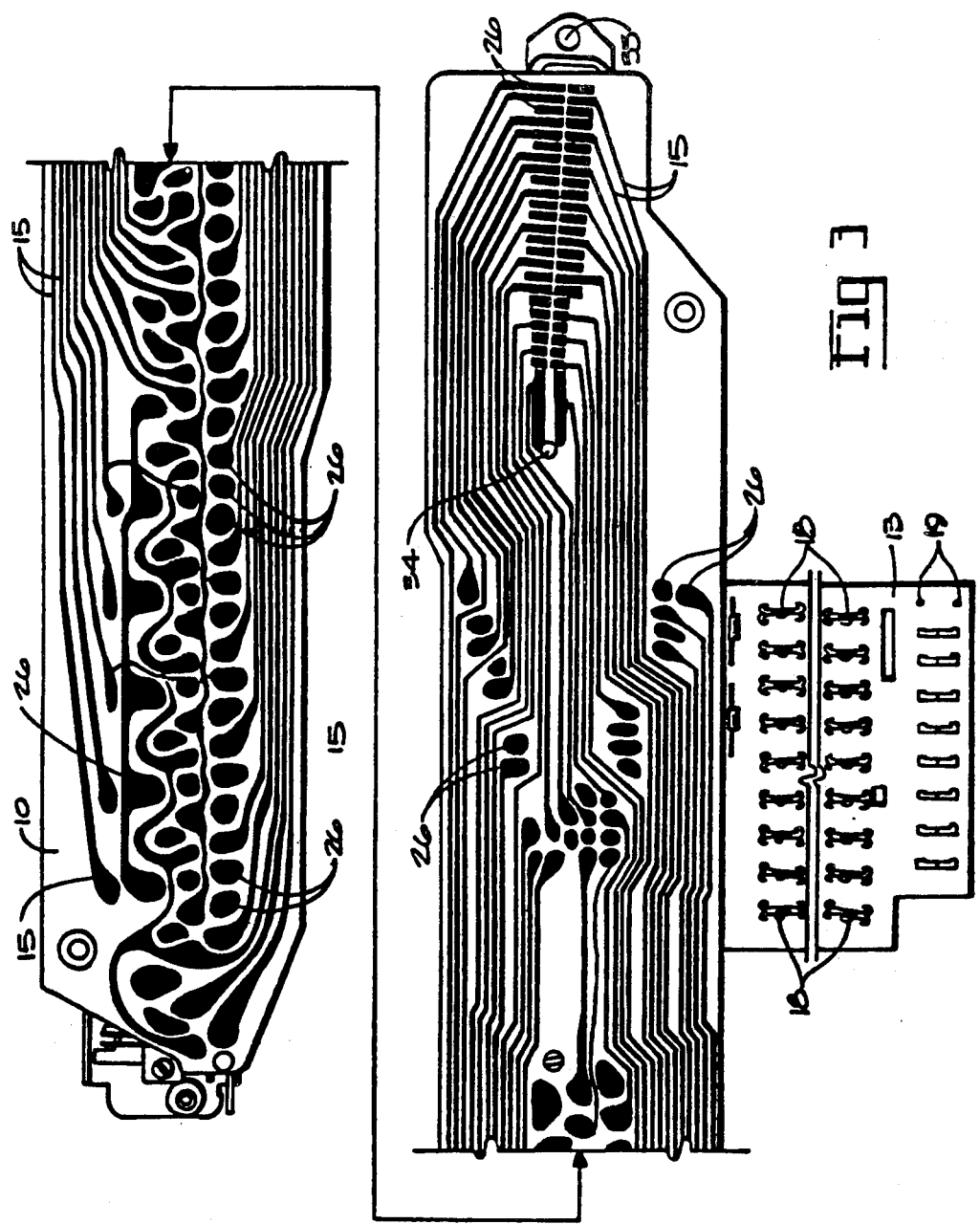
FIG. 3 is a bottom plan view of the assembly of FIG. 1.

As illustrated in FIGS. 1, 2 and 3, a flexible circuit member 10 has mounted thereon a linear array 11 of pushbutton switches 12, a terminal block 13 and a connector 14. In the particular example the connector 14 the female part of a push-together two part connector, the other male part being on the end of the line cord from the PBX. The terminal block 13 is attached upside down relative to the pushbutton switch array for reasons as will be explained. The flexible circuit member 10 is of a flexible electrical insulating material, for example mylar, with electrical circuit patterns formed thereon in the normal manner. In the example illustrated, considering the surface seen in FIG. 1 as the top surface of the flexible circuit member, the circuit patterns are formed on the bottom surface, and are indicated by dotted lines in FIG. 1, and shown in full at 15 in FIG. 3.

The linear array 11, of pushbutton assemblies 12, shown foreshortened in the drawings, for convenience, typically comprises a row of pushbuttons, such as ten, with the various pushbuttons arranged for a variety of purposes, for example line selection, conferencing, call transfer, speed calling, and the like. Such a row of pushbuttons will be mounted as to extend up through the top cover or housing of a telephone set, and in the present example is mounted or attached at one end of the flexible circuit member 10.

The terminal block 13, in the example illustrated, and particularly as seen in FIG. 3, has a plurality of terminals 18 arranged in columns and rows and adapted to receive spade type terminals on the end of conductors for connection to other items of the telephone set, such as a network, ringer, transmitter and receiver, and other items. A double row of wire terminals 19 is provided to provide means for applying interconnecting members between opposed pairs of the terminals 19 to interconnect or short-out parts of circuits within the telephone set, depending upon the particular services to be provided. The terminal block 13 is in the form of a rigid PCB with circuit patterns on the side or surface remote from the surface which extend the terminals 18. In the example illustrated the terminals 18 are positioned towards one end of the board and extend in a direction opposite to that of the pushbutton switches 12 and the connector 14, the terminals 19 being at the other end. The terminal block 13 as a whole extends externally from the flexible circuit member 10, the terminals 18 being on the laterally extending end, and is mounted or attached at an intermediate position on the flexible circuit member 10.

Attached to the other end of the flexible circuit member 10 is the connector 14. In the example illustrated, the connector comprising a base 20 and an upstanding peripherably extending wall 21. Within the space defined by the wall 21 are provided terminals 22, in the example arranged to two rows. The connector 14 forms one half, in the example the female half, of a connector for connecting the line cord to the telephone set.

In each instance, the pushbutton array 11, the terminal block 13 and connector 14 are attached to the flexible circuit member 10 by terminal pins extending through the circuit member. The pins can be seen at 25 in FIG. 2. The pins are wave soldered to contact areas 26, in FIGS. 3 and 1, whereby the members, array 11, terminal block 13 and connector 14, are electrically connected to the circuit patterns 15. In the terminal block 13, the terminals 18 are themselves wave soldered to the circuit pattern 27 by means of terminal pins on the bases of the terminals 18 passing through the PCB. Terminal pins 25 are provided at the end of the PCB remote from the terminals 18 for connection to the flexible circuit member.

Figure 4:
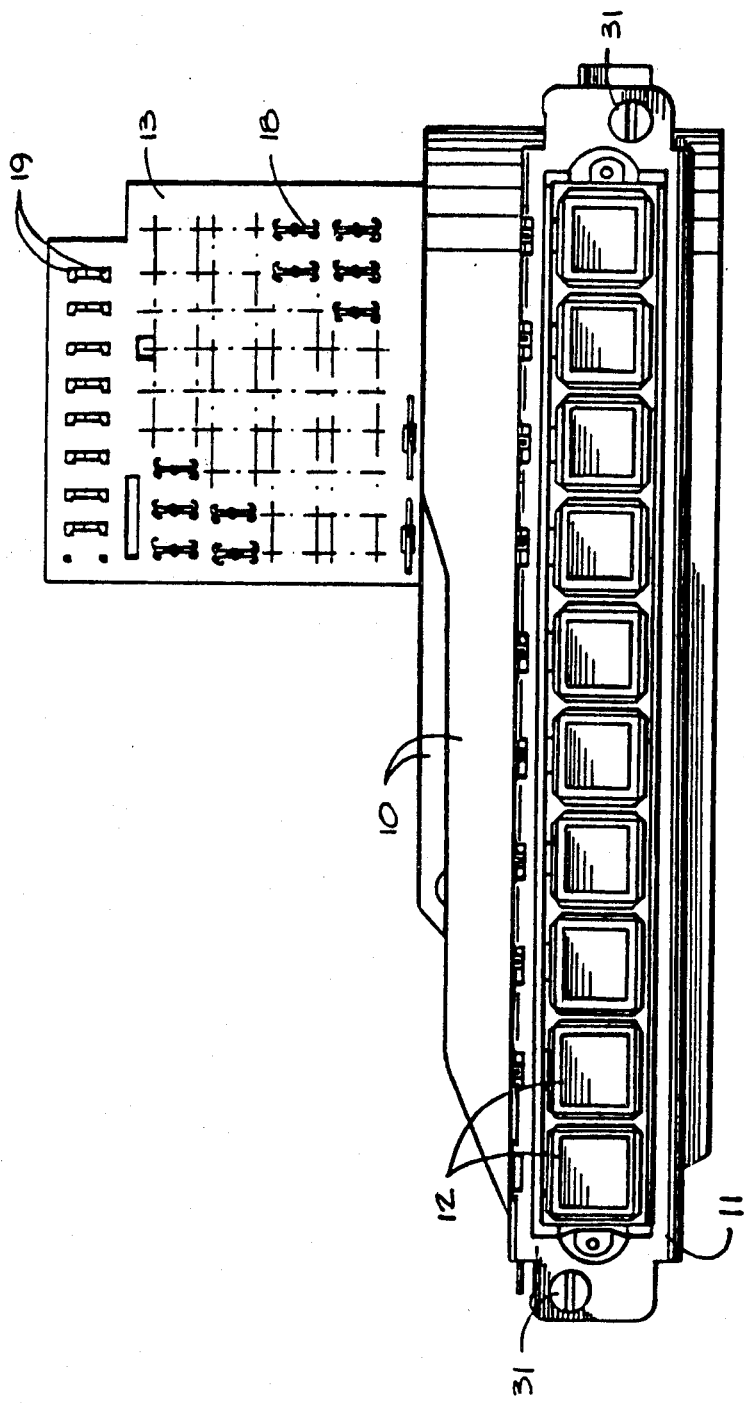
FIG. 4 is a top plan view of the assembly of FIG. 1, but showing the flexible circuit member folded to position the various members as required.

As previously stated, the items mounted on the flexible circuit member 10, are positioned at particular positions in the telephone set, the relative positioning occasioning flexing, bending or folding of the flexible circuit member. FIGS. 4 and 5 illustrate the relative positioning of the three items, pushbutton switch array 11, terminal block 13 and connector 14, as they would be positioned in one form of telephone set. The flexible circuit member 10 is folded down and under the switch array 11, being folded at one end of the array, at 30. The positions the connector 14 beneath the switch array 11, and near one end thereof, the end remote from the fold 30. The connector is of course now reversed relative to the switch array, and similarly the terminal block 13 is reversed, or turned upside down, relative to FIGS. 1 and 2. This brings the terminals 18 uppermost, considering the pushbutton switch array as on the top. The pushbutton will project through the top housing or cover of the telephone set, being attached to mounting members in the telephone set by screws 31. The terminal block 13 will rest on supports formed in the telephone set base, and can be arranged to clip in if desired. The connector 14 is attached to mounting members in the base of the telephone set by screws passing through holes 33 in the base 20. A hole 34 is provided in the flexible circuit member 10 to permit passage of the screw through the base of the connector. The connector is mounted high enough off the base surface of the telephone set base to provide sufficient room for the other half of the connector and for the line cord or cable attached thereto, to provide a flat lower surface for the telephone set.

As an alternative, not illustrated, the flexible circuit member can be folded between the terminal block 13 and the connecor 14.

The use of a flexible circuit member to both electrically and mechanically connect items together enables such items to be preassembled with a considerable reduction in labour content by the avoidance of hand soldering a large number of connections. The circuit patterns on the flexible circuit member are produced by methods such as printing or photolitho-graphic etching which ensure that the circuit patterns are identical on each member. Thus any errors which may occur in hand-soldering, or hard wiring are obviated. Because of the complexity of the wiring, and the number of individual connections, much of the conventional wiring is carried out with one or more items in position in the telephone base. With the present invention the items can be pre-assembled. The use of the flexible circuit member enables items to be assembled to the circuit member in the most convenient way for production and then the flexible circuit member bent or folded or otherwise manipulated so that the items finish up in the desired positions and with the desired orientation. In the event of damage or electrical fault occurring to an item, the whole assembly can be removed and replaced quickly and easily, leaving repair or replacement of the individual item to be carried out, if desired or worthwhile financially, at a central repair station.

What is claimed is:

1. A pushbutton switch assembly for a telephone set, comprising:
an array of pushbutton switches having pushbuttons extending from a top surface and a plurality of terminal pins extending from a bottom surface;
a terminal block comprising a circuit board having a plurality of terminals at one end of the board and a plurality of terminal pins at the other end of the board;
a connector comprising a base and a plurality of terminals extending from the base in one direction and terminal pins extending from the base in an opposite direction to said terminals;
an elongate flexible circuit member interconnecting said array of pushbutton switches, said terminal block and said connector, said terminal pins of the pushbutton switch assembly, terminal block and connector extending through said flexible circuit member and soldered to contact areas on the flexible circuit member;
the flexible circuit member foldable at one side of the terminal block to hold at least the connector back under the remainder of the flexible circuit member.

2. An assembly as claimed in claim 1, said pushbutton switches, said terminal block and said connector all mounted on a top surface of said flexible circuit member, said terminal pins all extending through to a bottom surface of the flexible circuit member.

3. An assembly as claimed in claim 1, said terminals on said circuit board extending in the same direction as the terminal pins on said circuit board, said flexible circuit member foldable between said pushbutton switches and said terminal block whereby the terminal block and the connector extend beneath the pushbutton switch assembly, the terminals of the terminal block offset laterally to one side of said pushbutton switches.

4. An assembly as claimed in claim 1, the pushbutton switches extending in a linear array.

5. For use in a telephone set, a pushbutton switch assembly comprising:
a linear array of pushbutton switches having pushbuttons extending upwardly from a top surface and a plurality of temrinal pins extending downwardly from a bottom surface;
a rectangular terminal block having a plurality of terminals extending upwardly from one end of the terminal block and a plurality of terminal pins extending upwardly from the other end of the terminal, the terminal block positioned below one end of the pushbutton switch area with the one end extending laterally from beneath the switches;
a connector positioned below the other end of the pushbutton switch array and including a base, a plurality of terminals extending downwardly from the base and a plurality of terminal pins extending upwardly from the base; and
an elongate flexible circuit member interconnecting the pushbutton switch array, the terminal block and the connector, the flexible circuit member extending adjacent to said bottom surface of the pushbutton array and folded down and back over said terminal block and said connector, the terminal pins of said switch array, said terminal block and said connector extending through said flexible circuit member and soldered to contact areas on the circuit member, said contact areas on a common surface of said circuit member.

6. An assembly as claimed in claim 5, including a peripherally extending wall around said base of said connector, said terminals within said peripherally extending wall, the wall extending downwardly from said flexible circuit member.

* * * * *